United States Patent [19]

Beirne

[11] 4,410,766

[45] Oct. 18, 1983

[54] POWER SAVING LINE CIRCUIT

[75] Inventor: Patrick R. Beirne, Stittsville, Canada

[73] Assignee: Mitel Corporation, Kanata, Canada

[21] Appl. No.: 285,659

[22] Filed: Jul. 21, 1981

[30] Foreign Application Priority Data

Feb. 20, 1981 [CA] Canada .................................. 371392

[51] Int. Cl.³ ....................... G05F 1/613; H04M 1/76; H04M 19/00
[52] U.S. Cl. ..................................... 179/16 F; 323/284
[58] Field of Search .................. 179/16 F, 16 AA, 70, 179/77; 323/284, 285, 272

[56] References Cited

U.S. PATENT DOCUMENTS

| 3,300,588 | 1/1967 | Flowers | 179/70 |
| 3,828,139 | 8/1974 | Chambers, Jr. | 179/16 F |
| 4,282,407 | 8/1981 | Stiefel | 179/18 FA |
| 4,329,542 | 5/1982 | Wild | 178/69 R |

FOREIGN PATENT DOCUMENTS

| 2209639 | 9/1973 | Fed. Rep. of Germany | 179/16 F |
| 2065418 | 6/1981 | United Kingdom | 179/77 |

Primary Examiner—Thomas W. Brown
Attorney, Agent, or Firm—Alan H. Levine

[57] ABSTRACT

This invention is a circuit for reducing the power requirements for a subscriber's line where the loop length is short. The circuit senses the line current in the off-hook condition, and if the line current is above a predetermined threshold, it decreases the power supply voltage. When the line is restored to the on-hook condition, the original high voltage is restored. A substantial reduction in the cost and size of the power supply is thus obtained.

9 Claims, 2 Drawing Figures

POWER SAVING LINE CIRCUIT

This invention relates to telephone circuits, and more particularly to apparatus for reducing the power supply requirements for certain subscribers' lines.

A telephone switching office or PBX normally supplies operating power to the subscriber's line, typically applying 48 volts to the tip and ring leads. Apparatus at the switching office or PBX is provided to sense the line current, whereby the on-hook or off-hook condition of the line is determined. Since the telephone set at the end of the subscriber's line is of relatively high resistance in the on-hook condition and low resistance in the off-hook condition, a substantial increase in loop current designates that the telephone set is off-hook. However a small amount of line current often is drawn in the on-hook condition, due to line leakage, etc.

Subscribers' lines connected to a switching office or PBX have greatly differing resistance. An off-hook subscriber's telephone set connected in series with a short line typically exhibits low resistance, e.g. 200 ohms or less, while a longer lines in series with the telephone set often exhibits several hundred or in excess of a thousand ohms. Clearly the currrent drawn by a long line is substantially less than the current drawn by a short line. Since standarized off-hook detection apparatus must detect current changes associated with a long-line, low current condition, a great deal of the current drawn by a short line is wasted.

The present invention detects an excessively high current draw in the off-hook condition, and automatically reduces the line current, thus saving power. The power saving feature is desirable not only to reduce energy cost, but also to reduce power supply requirements, thus allowing a substantial reduction in size and cost of components of the power supply. The resulting power supply and size reduction is important for recently designed miniature PABX systems not only for size, but also to help alleviate heat dissipation constraints.

According to the present invention, operating current drawn from a power source by the subscriber's line above a predetermined threshold is detected, and in response thereto, a lower voltage power source is connected to the line in place of the original, thus reducing the current drawn by the line. Once the current drawn has been reduced below a second lower threshold, the higher voltage power source is reconnected.

The first, higher threshold is established at an off-hook current level drawn via an arbitrarily determined short loop, at the standard line voltage, e.g. 48 volts. When an off-hook condition occurs in which the current drawn is higher than the threshold, a preferably 28 volt supply is applied to the subscriber's line, thus reducing the current drawn.

However, for longer loops, the off-hook condition results in line current drawn which is below the threshold, and the higher voltage supply is maintained.

When the subscriber goes on-hook, the line current drops to a level which is lower than a second current threshold, which threshold is established for the higher supply voltage level; the line current will clearly be even less with the low voltage supply connected to the line circuit. Upon detection of a line current level lower than the second threshold, the high voltage supply is reconnected to the subscriber's line.

Clearly, for low resistance, i.e., short subscriber line, a substantial current saving is achieved by the use of this invention.

In general, the power saving circuit of the invention is comprised of apparatus for supplying power from either a higher voltage source or from a lower voltage source to a line, apparatus for detecting current drawn by the line which is higher than a first predetermined current level, when the higher voltage source is connected to the line, and apparatus for switching the lower voltage source to the line in substitution for the higher voltage source upon detection of said higher drawn current.

A better understanding of the invention will be obtained by reference to the description below, in conjunction with the following drawings, in which.

Figure 1:
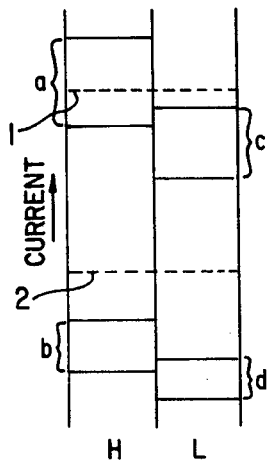
FIG. 1 is a graph used to illustrate the principles of the invention.

Turning first to FIG. 1, the current levels associated with a normal line current supply are shown. This supply typically provides −48 volts applied to the ring lead via a matching resistor such as 225 ohms, which is returned to ground via a 225 ohm resistor connected to the tip lead. Increasing current is shown by the arrow.

Various line lengths of course exhibit various levels of resistance, resulting in currents, in the off-hook condition, typically varying in the range a. Relatively short loops, for example having about 500 ohms, result in a draw of about 50 milliamperes or more of current. This level is shown by the dotted line 1, and is here designated as a threshold level. If the off-hook telephone set is 200 ohms, then this represents about 300 ohms of line cable. Where the cable is 26 AWG, this represents about 1.25 Km. of line length.

A second threshold level 2 represents the on-hook condition; line currents below this level are considered to represent the on-hook condition. A current sensor at the switching office or PBX detects current below 15 milliamperes which is indicative of the on-hook condition.

Subscriber's line current which is typically carried by the line in the on-hook condition is represented by the range b, which current generally is due to line leakage.

According to the present invention, upon detection of line current above the first threshold, the supply voltage is switched to a lower level, e.g. −28 volts. This causes the off-hook line current to drop to a range c, which usually will be below the threshold 1. It may be seen that the current drawn is substantially reduced, and thus the corresponding power supply requirements are similarly reduced. The high current condition which is above the threshold 1 will of course only occur when the line length is short, e.g., has low resistance. Yet the amount of current which is drawn at the low supply voltage is still sufficiently above the threshold 2 that there is virtually no possibility of a long line length off-hook current level being confused with the second on-hook threshold level 2, which as noted earlier is about 15 milliamperes.

When the subscriber goes on-hook, the current on the subscriber's line drops to a level within a lower range d. The present invention detects that the current has dropped below the threshold 2, and reestablishes connection of the higher voltage supply, whereupon the line current rises to within the range b, where it idles.

Figure 2:
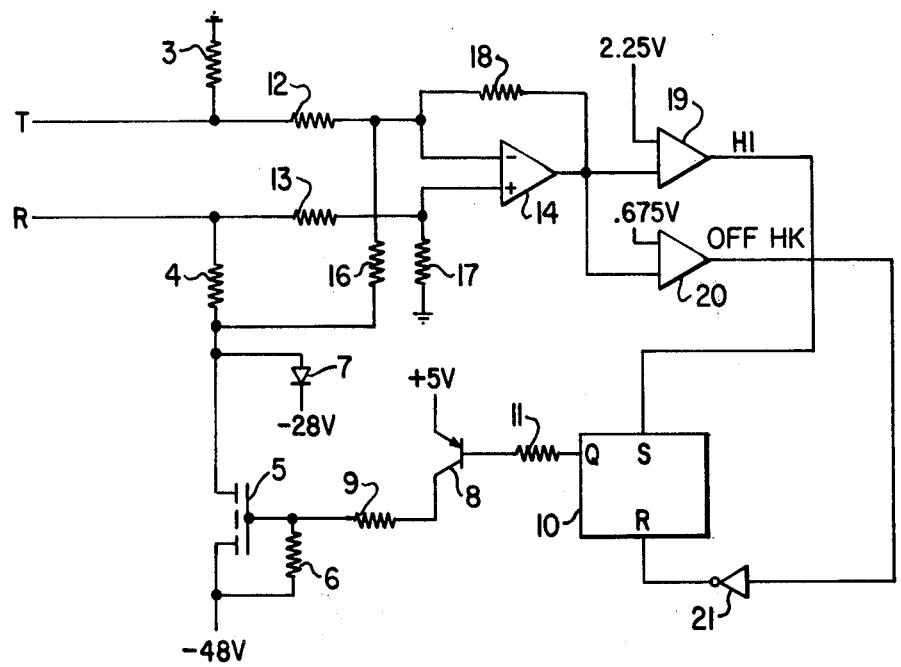
FIG. 2 is a schematic diagram of a preferred form of the invention.

FIG. 2 is a schematic of a preferred embodiment of the invention. Tip and ring leads T and R are connected through matching resistors 3 and 4 (typically 225 ohms each) to ground and a −48 volt supply terminal. However the lead to the −48 volt terminal is interrupted, and passes through the source-drain circuit of a VMOS device 5. The gate of the VMOS device is connected to −48 volt terminal for bias via a resistor 6.

The junction between the VMOS device and resistor 4 is connected to the anode of a diode 7, whose cathode is connected to a −28 volt supply terminal. Clearly other supply voltages than −28 volts can be used, while the benefits of the present invention are still obtained.

The gate of VMOS device 5 is connected to the collector of a transistor 8 via a resistor 9; the emitter of transistor 8 being connected to a source of supply +5 V. The base of transistor 8 is connected to the Q output of a bistable flip flop 10 through resistor 11.

The tip and ring leads are connected through corresponding high resistance resistors 12 and 13, e.g., matched at 200K each, to the inputs of differential amplifier 14. The junction between resistor 12 and inverting input of differential amplifier 14 is connected through resistor 16 to the high and low supply sources through VMOS device 5 and diode 7 respectively, each of which is connected to resistor 4. Resistors 17, 16 match corresponding resistors 12 and 13.

Differential amplifier 14 is connected in a well known manner with resistor 17 connected from its noninverting input to ground, and resistor 18 connected between its output and its inverting input. Resistors 17 and 18 should be of equal value, and about 1/10th the value of resistor 12.

The output of differential amplifier 14 is connected to one input of each of comparators 19 and 20. The other input of comparator 19 is connected to a source of voltage e.g., 2.25 volts, and the other input of comparator 20 is connected to a source of voltage e.g., 0.675 volts.

The output of comparator 19, labelled HI is connected to the set input S of flip flop 10, and the output of comparator 20, labelled OFHK, is connected through inverter 21 to the reset input R of flip flop 10.

Operation of the circuit is as follows. With the VMOS device 5 switched on, current from the −48 volt source terminal is applied through resistor 4 to the ring lead R, and returned to the supply from the tip lead through resistor 3 and ground. Since the cathode of diode 7 is connected to a voltage (−28 volts) which is more positive than the voltage at its anode (about −48 volts), it is switched into its non-conductive state.

When the VMOS device is switched off, the anode of diode 7 becomes more positive than its cathode, and it is switched into its conductive state. Consequently the −28 volt source is applied in place of the −48 volt source through resistor 4 to the ring lead, the current being returned from the tip lead through resistor 3 to ground.

While a VMOS device is preferred as the switching means, other forms of switches can be used in place thereof, e.g., relay contacts, other solid state forms of switches, etc. For the particular circuit which is shown, when the voltage at the gate of VMOS device 5 (the enabling voltage) is raised above −48 V (to about +5 V), its source-drain circuit becomes conductive, and the −48 volt supply is applied to the subscriber's line. In the other biased off condition, the lower voltage supply at −28 V is applied to the subscriber's line.

A VMOS device has the advantage that its conductive path will handle bipolar currents (which an NPN transistor, for example, will not).

The remainder of the circuit shown is adapted to sense whether the line current is above or below the aforenoted threshold levels, and to apply the enabling voltage referred to above to the gate of VMOS device 5.

Differential amplifier 14 converts the detected current level carried by the tip and ring leads to a voltage, which is applied to the high current threshold and off-hook current threshold detecting comparators 19 and 20. The output voltage of differential amplifier 14, with the resistor values noted earlier, changes by 45 millivolts per milliampere of loop current. Where the line current is less than e.g. 15 milliamperes, the output of comparator 20 goes to low level voltage, which is inverted in inverter 21, and the resulting high level voltage is applied to the reset input R of flip flop 10. This results in a low level voltage on the Q output, which causes conduction of transistor 8, and the application of about +5 volts to the gate of VMOS device 5. VMOS device 5 thus conducts, causing the application of about −48 volts to the ring lead, as described earlier.

Accordingly, in the on-hook condition in which less than 15 milliamperes of current is carried by the subscriber's loop, i.e., below threshold 2 in FIG. 1, the supply voltage is switched to the high level, and the current drawn is within the range b referred to earlier with respect to FIG. 1.

If, however, the line current level is higher than 50 milliamperes, i.e., higher than threshold 1 in FIG. 1, a voltage higher than 2.25 volts is applied to comparator 19 from differential amplifier 14, and a high level output is presented on the HI lead which is connected to the set input S of flip flop 10. As a result, flip flop 10 causes a high level positive voltage to appear on its Q output, thus reverse biasing the base-emitter junction of transistor 8, stopping its conduction. VMOS device 5 thus switches off, and the −28 volt source is connected to the ring lead via diode 7 and resistor 4, as described earlier.

It should be noted that long telephones lines may pick up substantial longitudinal currents. The VMOS device (or a relay) can supply power in the presence of these currents.

When switched to the low voltage state, the diode cannot supply these longitudinal currents, but since the diode is only on for short loops, they are much less likely to have these currents. If the switching is done by microcomputer, in the rare exception in which substantial longitudinal currents are present on a short loop, it may be left connected to the high voltage.

The apparatus has thus been shown to detect a current level above the high current threshold 1, and as a result has connected the low voltage supply to the line, thus reducing considerably the amount of current required to be supplied by the central office or PBX power supply.

It will of course be appreciated that current sensors different from those described could be used by a person skilled in the art understanding this invention. The current sensors could operate a microprocessor which sends an enable signal to a switch, being either of the VMOS device type described herein, or some other type of switch in its place. Further, the form of power supply switching described, i.e., the combination of a VMOS device and diode, could be replaced by some other form of switching as desired.

However it should be emphasized that the essential aspect of the invention is the recognition of current flow in a circuit which is higher than a predetermined level, which designates a low line resistance, whereupon a lower voltage supply is applied to the circuit. The higher voltage supply is switched back in place of the lower voltage supply upon detection of the line current falling below a predetermined lower threshold.

A person skilled in the art understanding this invention may now conceive of other embodiments or variations thereof. All are considered to be within the sphere and scope of this invention as defined in the claims appended hereto.

The embodiments of the invention in which an exclusive property or privilege is claimed are defined as follows:

1. A power saving circuit comprising:
   (a) means for supplying power alternatively from a first voltage source or a second voltage source applying voltage lower than the first voltage source to a line,
   (b) means for detecting current drawn by said line which is higher than a first predetermined current level, when the first voltage source is connected to the line,
   (c) means for switching the second voltage source to the line in substitution for the first voltage source upon detection of said first current draw which is higher than the first predetermined level,
   (d) means for detecting current drawn by the line which is below a second predetermined current level which is lower than the first predetermined current level, and
   (e) means for switching the first voltage source to the line upon detection of said current drawn below said second predetermined current level.

2. A power saving circuit comprising:
   (a) means for applying current to a line from a low voltage source through a diode, said diode having its cathode connected in a circuit to the negative terminal of the low voltage source,
   (b) means for applying current from a higher voltage source through a switching means to the line with its negative terminal connected in a circuit to the anode of the diode through said switching means, whereby the diode is reverse biased when the switching means is closed, the positive terminals of both said sources being connected to line current return circuit means,
   (c) means for detecting current drawn by the line above a first predetermined current level, and
   (d) means for switching the switching means open circuited upon detection of said current above said predetermined current level.

3. A power saving circuit as defined in claim 2, in which the switching means is a VMOS device having source and drain terminals connected in a circuit between the higher voltage source and the line, and a gate terminal connected to a source of switching signals operated by the current detecting means.

4. A power saving circuit as defined in claim 2 or 3, further including means for detecting current drawn by the line which is below a second predetermined current level which is lower than the first predetermined current level, and means for switching the higher voltage source to the line upon detection of said current drawn below said second predetermined current level.

5. A power saving circuit as defined in claim 3, in which said gate terminal is connected via a circuit path to one output of a bistable flip flop, one input of the flip flop being connected to the output of means for detecting current drawn by the line above said first predetermined current level, and further including means for detecting current drawn by the line which is below a second predetermined current level which is less than the first predetermined current level, its output being connected to a second input of the flip flop for causing the switching of the switching means closed upon detection of said current drawn below said second predetermined current level.

6. A power saving circuit comprising:
   (a) a subscriber's line circuit including tip and ring leads,
   (b) a pair of resistors, each having one terminal connected to a corresponding tip or ring lead, the other terminal of one resistor being connected to a common voltage terminal,
   (c) a diode having its anode connected to the other terminal of the other resistor, and its cathode connected to a power supply providing one voltage level,
   (d) a bipolar current switch means connecting the other terminal of the other resistor to a power supply providing a higher more negative voltage level than said one voltage level,
   (e) first means for detecting line current in said line circuit which is lower than a first predetermined level and for enabling the switch means to close, whereby the higher voltage level is applied to the line, and
   (f) second means for detecting line current in said line circuit which is higher than a second predetermined level which is higher than said first predetermined level and for inhibiting the switch means from being closed, whereby the lower voltage level is applied to the line.

7. A power saving circuit as defined in claim 6, in which the switch means is a VMOS device.

8. A power saving circuit as defined in claim 6 or 7 in which said one voltage level is about −28 volts and the higher voltage level is about −48 volts.

9. A power saving circuit as defined in claim 7 including a bistable flip flop having SET and RESET inputs and a Q output, the output of the second detecting means being connected to the SET input, the output of the first detecting means being connected to the RESET input, and the Q output being connected via a driving transistor to a gate input of the VMOS device.

* * * * *